United States Patent
Gold et al.

(10) Patent No.: US 7,237,056 B2
(45) Date of Patent: Jun. 26, 2007

(54) TAPE MIRROR INTERFACE

(75) Inventors: Stephen Gold, Fort Collins, CO (US); Harald Burose, Herrenberg (DE); John McCarthy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 10/715,167

(22) Filed: Nov. 17, 2003

(65) Prior Publication Data

US 2005/0108470 A1    May 19, 2005

(51) Int. Cl.
*G06F 12/00* (2006.01)
(52) U.S. Cl. ............................ 711/4; 711/112; 711/150; 711/162; 711/168
(58) Field of Classification Search ...................... None
See application file for complete search history.

(56) References Cited

U.S. PATENT DOCUMENTS

| | | | |
|---|---|---|---|
| 5,559,764 A | 9/1996 | Chen et al. | |
| 5,611,069 A | 3/1997 | Matoba | |
| 5,828,820 A | 10/1998 | Onishi et al. | |
| 6,766,412 B2 * | 7/2004 | Bolt | ............................ 711/111 |

* cited by examiner

*Primary Examiner*—Reginald Bragdon
*Assistant Examiner*—Horace L. Flournoy

(57) ABSTRACT

A tape mirror interface comprises an input terminal coupled to at least one input node and capable of receiving data transfer requests, a plurality of output terminals coupled to a plurality of tape storage devices, and a control element coupled to the input terminal and plurality of output terminals. The control element presents the plurality of tape storage devices as separate media devices and selectively controls data transfer in a synchronous mode and a split mode. In the synchronous mode, writes to a target tape storage media are mirrored to a mirrored tape storage media. In the split mode, writes are written to tape storage devices independently.

26 Claims, 5 Drawing Sheets

TAPE MIRROR INTERFACE

BACKGROUND OF THE INVENTION

Information technology and data handling systems commonly use data protection technology to defend against unexpected catastrophic events. Backup systems are a first line of defense against disaster. A second line of protection is mirroring systems, fault-protection systems for organizations that use tape drives for backup and recovery. A mirroring system creates a mirror copy of a backup session, doubling protection by enabling storage of identical backup records in different locations. A tape mirror gives backup and recovery protection by creating a mirror or virtual tape drive, generating two or more physical tape devices that appear as one unit in the mirror and operating in conjunction with existing backup software to write identical backup data to each tape drive in the mirror simultaneously.

A user often desires multiple copies of the same tape, written at the same time, for several reasons. A user may wish to store one copy of the backup tape onsite for fast data recovery and maintain a second copy offsite to protect against site-wide disasters. The user may desire a fail-over capability to increase the success rate of backups. The user may also desire a redundant system that creates multiple tape media copies for restoration purposes in case one copy of the media degrades or fails.

Some data protection software can create multiple tape copies by generating a first backup media, then copying a second tape from the first. A difficulty with the procedure is that any data corruption in the original backup tape media is duplicated on the second copy. Furthermore, the making of serial copies is time consuming. The time to create a second copy can be as long as the time to create the original backup. During the copy operation, both the original and duplicate backup copies are on line so that are susceptible to destruction, along with the originating system, during a site-wide disaster.

Tape mirroring can be used to generate a copy of a backup tape while the backup job is running. Tape mirroring techniques include software mirroring, for example utilizing software executing in a tape driver, and hardware mirroring, for example commonly functioning in a tape library. In either case, any write operation to a primary tape backup is concurrently mirrored to a second copy. In a mirrored backup, no time delay is incurred during creation of the second tape copy due to concurrent creation of the multiple copies.

SUMMARY

According to an embodiment of the disclosed system, a tape mirror interface comprises an input terminal coupled to at least one input node and capable of receiving data transfer requests, a plurality of output terminals coupled to a plurality of tape storage devices, and a control element coupled to the input terminal and plurality of output terminals. The control element presents the plurality of tape storage devices as separate media devices and selectively controls data transfer in a synchronous mode and a split mode. In the synchronous mode, writes to a target tape storage media are mirrored to a mirrored tape storage media. In the split mode, writes are written to the tape storage devices independently.

BRIEF DESCRIPTION OF THE DRAWINGS

Embodiments of the invention relating to both structure and method of operation, may best be understood by referring to the following description and accompanying drawings.

DETAILED DESCRIPTION

One difficulty with tape mirroring is that the mirror copies are identical. Data protection software tracks media in a database by a software label written to the beginning of the media when the tape is formatted. A tape mirror operation generates identical copies having identical software labels. As a consequence, data protection software cannot track the copies as separate copies of the tape backup set. Several adverse consequences result. For example, if one copy is read and found to be defective, software cannot determine whether another copy exists to allow for restoration. Also, if one copy is marked as scratch media as a result of a media rotation scheme and a second copy is loaded into the tape library, then the second copy is likely to be overwritten. Accordingly, administrators cannot protect offsite media with a longer tape rotation scheme compared to the onsite tape copy. Furthermore, if one copy is marked as defective, then software presumes that the second copy is also defective. Another difficulty is that, if contents of the two copies begin to diverge, for example a backup is appended to one copy but not to the other, then invalid information is contained on one copy.

In a tape library configuration, a controller controlling library robotics that move media from library slots to tape drives and back identify and track media. Accordingly, the controller is to track the presence of multiple physical tape drives and multiple media elements since the controller instructs the library to load the individual media elements into the multiple tape drives. One expedient measure is for the controller to incorporate the mirror handler so that library slots are mirrored as well as the physical tape drives. However, the measure can be unreliable since the mirror handler in combination with the tape library controller cannot handle defective media and can operate incorrectly if a user loads media into the wrong slots.

What is desired is a system and operating method that realizes the advantages of tape mirroring while enabling treatment of multiple tape copies as separate and individual media elements in a data protection system.

Figure 1:
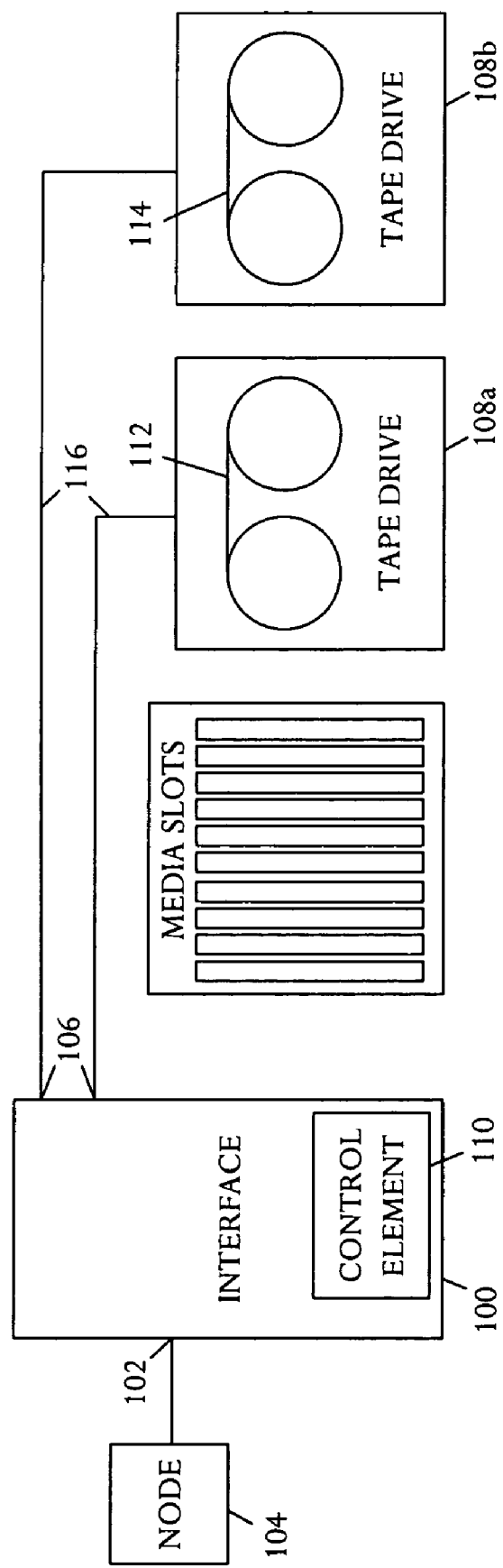
FIG. 1 is a schematic pictorial diagram illustrating an embodiment of a tape mirror interface that has a capability to enable and disable mirroring functionality.

Referring to FIG. 1, a schematic pictorial diagram illustrates an embodiment of a tape mirror interface 100 that has a capability to enable and disable mirroring functionality.

The illustrative tape mirror interface 100 has an input terminal 102 coupled to at least one input node 104. The tape mirror interface 100 can receive data and data transfer requests from the input nodes 104. The tape mirror interface 100 has a plurality of output terminals 106 coupled to a plurality of tape storage devices 108, for example tape drives 108. A control element 110 in or associated with the tape mirror interface 100 presents the plurality of tape storage devices 108 as separate media devices and selectively controls data transfer in a synchronous mode and a split mode. In the synchronous mode, the tape mirror interface 100 mirrors data that is written to a target tape storage media, for example media 112, to a mirrored tape storage media, for example media 114. In the split mode, the tape mirror interface 100 can perform write operations to the target tape storage media 112 and to the mirrored tape storage media 114 separately.

The tape mirror interface 100 can control data transfer to the tape storage devices 108 as directed by commands received from an external host computer, server, or other appropriate device that acts as an input node 104. Commands can include mirroring control commands, for example a SYNC command that enables mirroring and synchronizes writing to multiple tape storage devices 108 and a SPLIT command that enables separate writing to a multiple tape storage devices 108. The output terminals 106 are typically connected to buses 116 that carry data from the tape mirror interface 100 to the tape storage devices 108.

In various embodiments, the control element 110 can be implemented in various forms. The control element 110 can be implemented as a software mirror that uses a software Application Programming Interface (API) as a command interface. The API can be executable on various computers, processors, and controllers in a storage system, including execution on an external host computer.

Alternatively, the control element 110 can be implemented as a hardware mirror that uses a Logical Unit (LUN) as the command interface. In a particular example, the tape mirror interface 100 can be a FC-SCSI bridge and the control element 110 a SCSI LUN and receives and responds to SCSI mirror configuration commands. Another embodiment utilizes a hardware mirror with a command interface in the form of an out-of-band management interface such as a Local Area Network (LAN)-based control interface using a Transmission Control Protocol/Internet Protocol (TCP/IP) management protocol. Examples of appropriate TCP/IP management protocols include eXtensible Markup Language Common Information Model (xmlCIM) from Web-Based Enterprise Management (WBEM), Simple Network Management Protocol (SNMP), and others.

Hardware mirroring is often more resource-efficient since extra resources are not used on a backup server and the amount of data sent over the bus is halved. In contrast, a software mirror sends two writes through the driver and monitors both writes for completion status.

The tape mirror interface 100 presents the tape storage devices 108 and media as separate devices and separate media elements. Accordingly, the tape mirror interface 100 identifies, references, addresses, distinguishes, and in other ways presents to two or more mirrored tape drives and media as individual and separate components. Although the mirroring operation concurrently writes, or mirrors, data to one or more mirror devices while a backup is written to a primary backup storage device, the individual storage devices remain accessible as separate entities rather than having the target and mirrored devices accessed as a single device.

The tape mirror interface 100 enables data protection software to synchronize the multiple storage devices so that any writes to a primary device are mirrored to one or more secondary devices. Upon completion of the mirroring operation, a data protection system can issue a desynchronize command to the tape mirror interface 100 to separate accessibility of the target and mirror devices and restore functionality so that writes to one device are no longer mirrored to the other devices. Operation of the commands that enable and disable mirror functionality do not conform the two or more drives and media to an identical state following disablement then re-enablement of the mirror functionality to enable the data protection system to write different data to the individual media elements and to maintain differentiation of the various media elements.

In some embodiments, the control element 110 responds to the SYNC command by synchronously writing data to a primary tape storage device 108A and to a secondary tape storage device 108B with data discrepancies between the primary tape storage device and the secondary tape storage device being preserved. In contrast, the control element 110 responds to the SPLIT command by enabling writing to the primary tape storage device and to the secondary tape storage device separately.

The tape mirror interface 100 can be any appropriate interface and is commonly a bridge such as a Fibre Channel (FC) to Small Computer Systems Interface (SCSI) Bridge.

The tape storage devices or drives 108 can support any appropriate tape technology such as Advanced Intelligent Tape (AIT), Digital Analog Tape (DAT), Digital Linear Tape (DLT), Super DLT (SDLT), Linear Tape Open (LTO), Single channel Linear Recording (SLR), or other technology.

Figure 2:
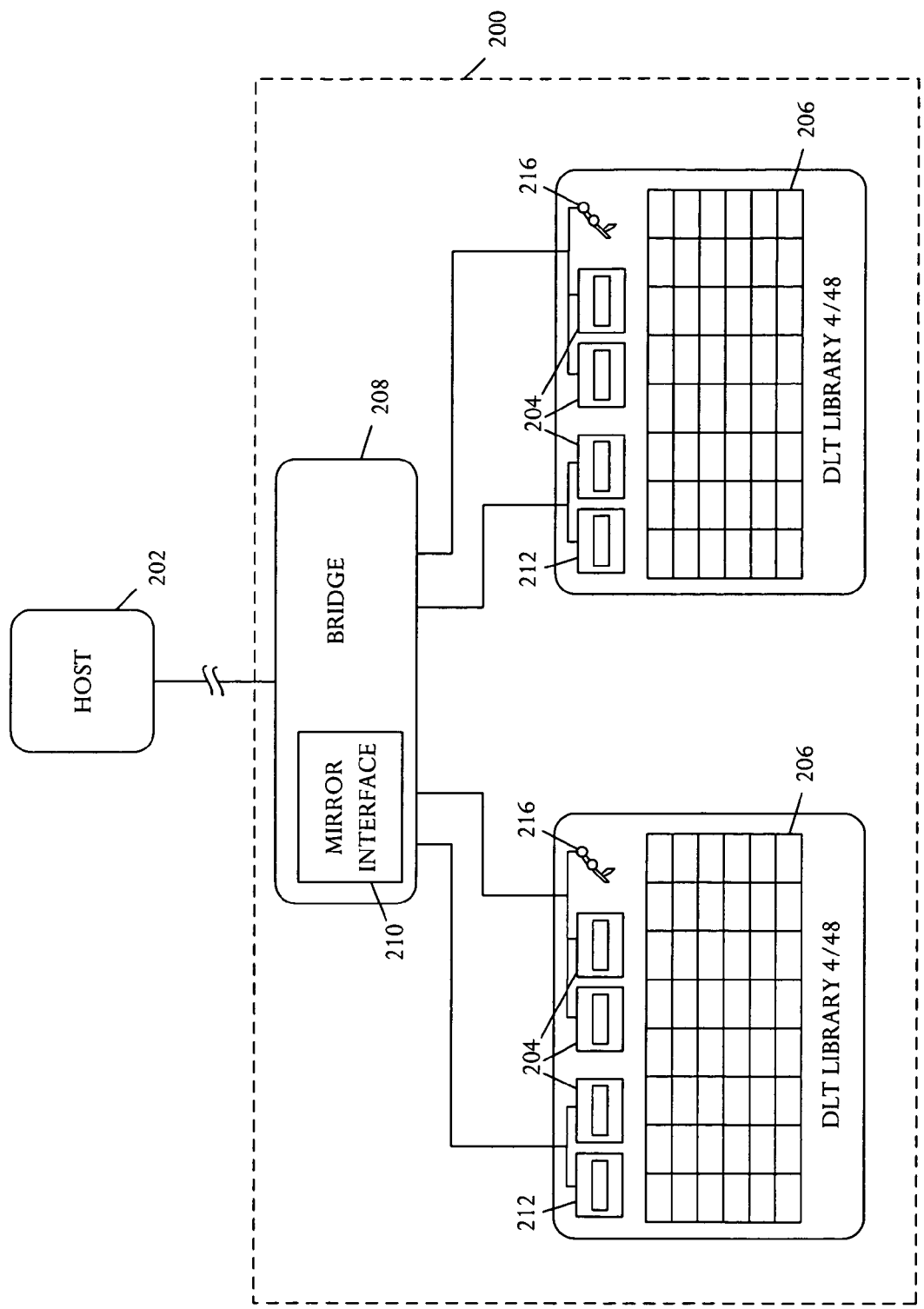
FIG. 2 is a schematic block diagram showing an embodiment of a tape library that can store data received from at least one external host.

Referring to FIG. 2, a schematic block diagram illustrates an embodiment of a tape library 200 that can store data received from at least one external host 202. The tape library 200 comprises a plurality of tape drives 204 that can access media stored in multiple media storage slots 206, and a bridge 208 coupled to the tape drives 204 that can transfer data between the external host 202 and the plurality of tape drives 204. The tape library 200 also comprises a mirror interface 210 associated with the bridge 208. Mirror interface 210 may be used to implement the tape mirror interface 100 shown in FIG. 1. The tape library 200 includes a robotic system 216 for transporting media elements, such as tape cartridges, between the tape drives 204 and the storage slots 206.

The bridge 208 functions as a pass-through device that receives and transmits data packets. The host 202 passes packets to the tape drives 204 and other bus devices as though the bridge 208 were a typical device on the bus. The bridge 208 enables access to multiple buses and peripherals, termed bus devices, by an interface or connector. In a particular embodiment, the bridge 208 can be a Fibre Channel to Small Computer Systems Interface (SCSI) Bridge so that the tape library 200 can use the capability of Fibre Channel devices to encapsulate SCSI protocol, enabling the host 202 with a Fibre Channel adapter to access SCSI peripheral devices transparently over a Fibre Channel connection.

The mirror interface 210 can selectively mirror write operations directed, for example, to a first tape drive 212 to a second tape drive 214. The mirror interface 210 can selectively control the data write operation to complete write operations only when both the first tape 212 and the second tape 214 return successful write status signals. Otherwise, the mirror interface 210 sets an error status. The mirror interface 210 presents the plurality of tape drives 204 to an external host 202 as separate and individual devices.

In a particular embodiment, the mirror interface 210 can be implemented as a hardware mirror in a Fibre Channel tape library 200. A Fibre Channel to SCSI bridge 208 interfaces between the tape drives 204 and the external Fibre Channel hosts 202. In the illustrative embodiment, two tape drives 204 are attached to each FC-SCSI bridge 208 and all data traffic to the two tape drives 204 pass through the bridge 208. In the illustrative configuration, an appropriate location for the mirror interface 210 is within firmware in the FC-SCSI Bridge 208. A similar implementation may also be suitable for bridges using different storage device interfaces such as an interface between external FC devices and internal FC devices, an interface between external internet SCSI (iSCSI) devices and internal SCSI devices, an interface between external internet SCSI (iSCSI) devices and internal FC devices, an interface between external iSCSI devices and internal iSCSI devices, and others. The mirror interface 210 can be similarly implemented in a storage appliance such as a Hewlett Packard® SANlink™ virtualization appliance.

The mirror interface 210 has a controlled capability to mirror write operations from one tape drive 204, called a primary drive, to another tape drive 204, termed a secondary or mirror drive. For enabled mirroring, a WRITE command, for example a SCSI WRITE command, received by the bridge 208 causes the mirror interface 210 to send the same WRITE command to both the primary and the secondary drives. The mirror interface 210 only completes the WRITE operation after both drives return status from the separate WRITE commands. If both WRITEs are successful, then status returned from the bridge 208 back to the initiating host 202 is also successful. However, if one of the WRITE commands fails, for example due to hardware failure, the bridge 208 returns an error signal back to the initiating host 202. If any external host attempts any media access command, including READ, WRITE, REWIND, SEEK, FILEMARK, or other commands, to the secondary tape drive while the secondary drive is mirrored to the primary tape drive, the bridge 208 returns a BUSY status to the host sending the command. The mirror interface 210 intercepts the interrupting command and prevents passing of the command to the secondary tape drive.

Figure 3:
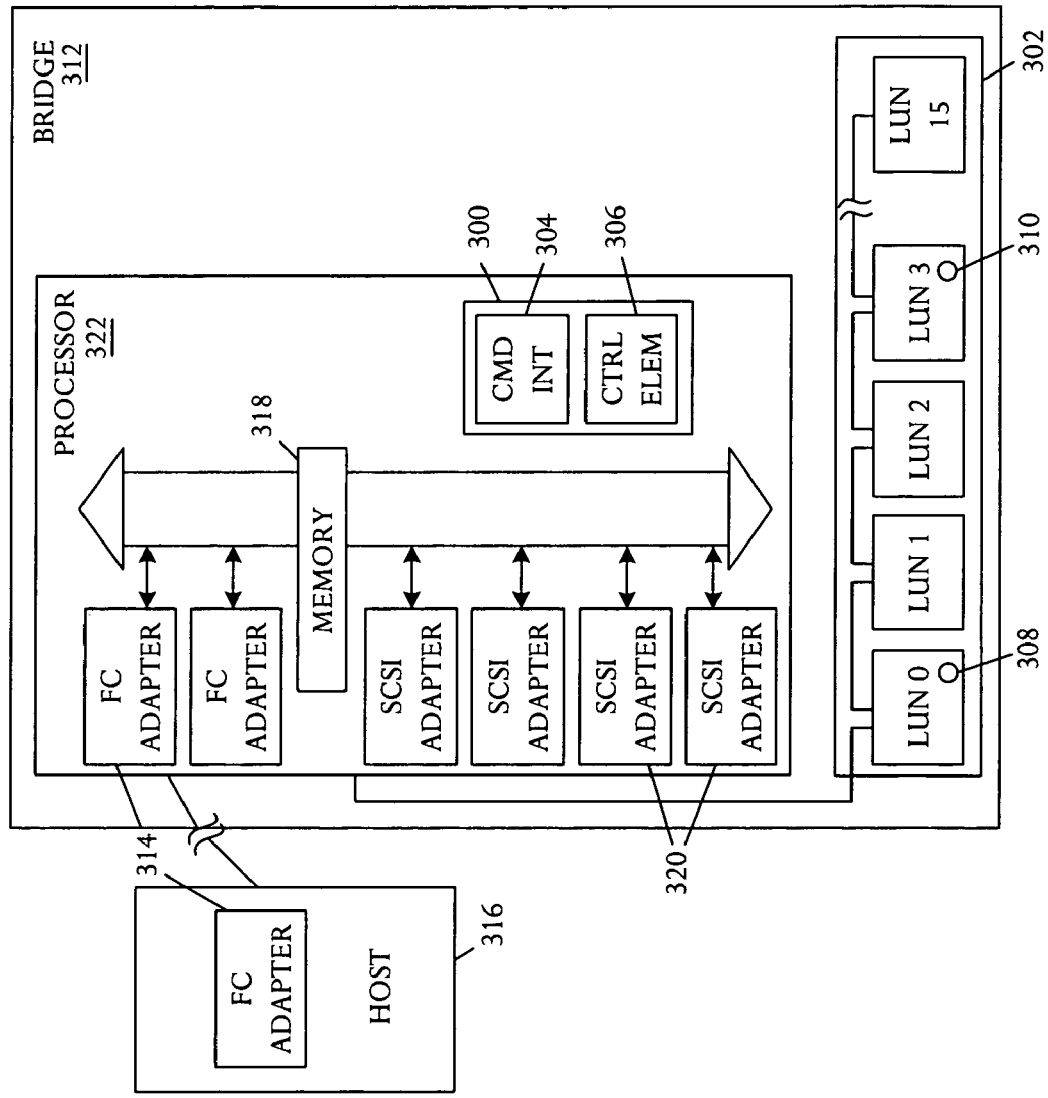
FIG. 3 is a schematic block diagram depicting an embodiment of a command interface controller for usage in a tape storage array.

Referring to FIG. 3, a schematic block diagram depicts an embodiment of a command interface controller 300 for usage in a tape storage array 302. The command interface controller 300 comprises a command interpreter 304 capable of identifying at least one interface command and a control element 306. The control element 306 responds to an identified interface command from a host adapter 314 of a host 316 and selectively controls data transfer in a synchronous mode so that writes to a target tape storage media 308 are mirrored to a mirror tape storage media 310. In a split mode, the control element 306 directs write operations to multiple storage devices independently.

The command interface controller 300 is implemented within a bridge 312 that presents the primary and secondary drives as separate Logical Units (LUNs) and also creates and presents a control LUN that enables commands to be directed to the bridge 312. Accordingly, the command interface controller 300 functions as a bridge control LUN in the manner of a virtual LUN. In the illustrative embodiment, the bridge 312 is a FC-SCSI bridge that presents the tape drives as Fibre Channel (FC) LUNs. The command interface controller 300, operating as a control LUN, can receive and respond to SCSI commands. The command interface controller 300 receives and responds to a SCSI command that is defined, for example, as a new MODE page command. The command interface controller 300 responds to the new MODE page command by detecting tape mirror functionality. The command interface controller 300 responds to a SCSI SYNC command by enabling the tape mirror and responds to a SCSI SPLIT command by disabling the tape mirror. If the bridge 312 is connected to only one tape drive when a command requests enabling of the tape mirror, the command interface controller 300 returns an error code indicating that the mirror mode is not supported with only one tape drive. The default state of the tape mirror mode is a disabled state so that a tape library is compatible with legacy products.

In an example of the operation of the command interface controller 300, the host 316 issues a SCSI command. A FC adapter 314 encapsulates the command in the FC protocol and sends a packet to the bridge 312. A FC adapter 314 in the bridge 312 receives the packet, strips the header, interprets the FC information, and places the packet in memory 318. The processor 322 interprets the SCSI information and programs an appropriate SCSI adapter 320 and FC adapter 314 to process the transaction. The SCSI adapter 320 sends the command to a targeted SCSI device or Logical Unit (LUN). In the illustrative system, at least some of the LUNs form the storage array 302. The targeted LUN interprets the command prepares to act. Data flows from the targeted LUN to the host 316 through memory 318.

The control element 306 processes various SCSI commands. The control element 306 presents a plurality of tape storage devices or LUNs and the corresponding media in the tape storage array 302 to the external host 316 that issues commands as separate and individual tape storage devices and media.

The command interpreter 304 can receive a MODE command and activate the control element 306 to respond to the MODE command by designating whether the command interface controller supports tape mirror functionality and whether tape mirror functionality is enabled or disabled.

The command interpreter 304 can receive a SYNC command and activate the control element 306 to respond to the SYNC command by enabling mirror functionality and synchronously writing data to a primary tape storage device and to a secondary tape storage device. Data discrepancies between the primary tape storage device and the secondary tape storage device are preserved.

The command interpreter 304 can receive a SYNC command and activate the control element 306 to respond to the SYNC command by determining whether less than two tape storage devices are coupled to the command interface and, if so, returning an error message.

The command interpreter 304 can receive a SPLIT command and activate the control element 306 to respond to the SPLIT command by disabling mirror functionality and writing to a primary tape storage device and to a secondary tape storage device separately. Therefore, the interface is responsive to the commands to provide a selectable mirroring interface.

Figure 4:
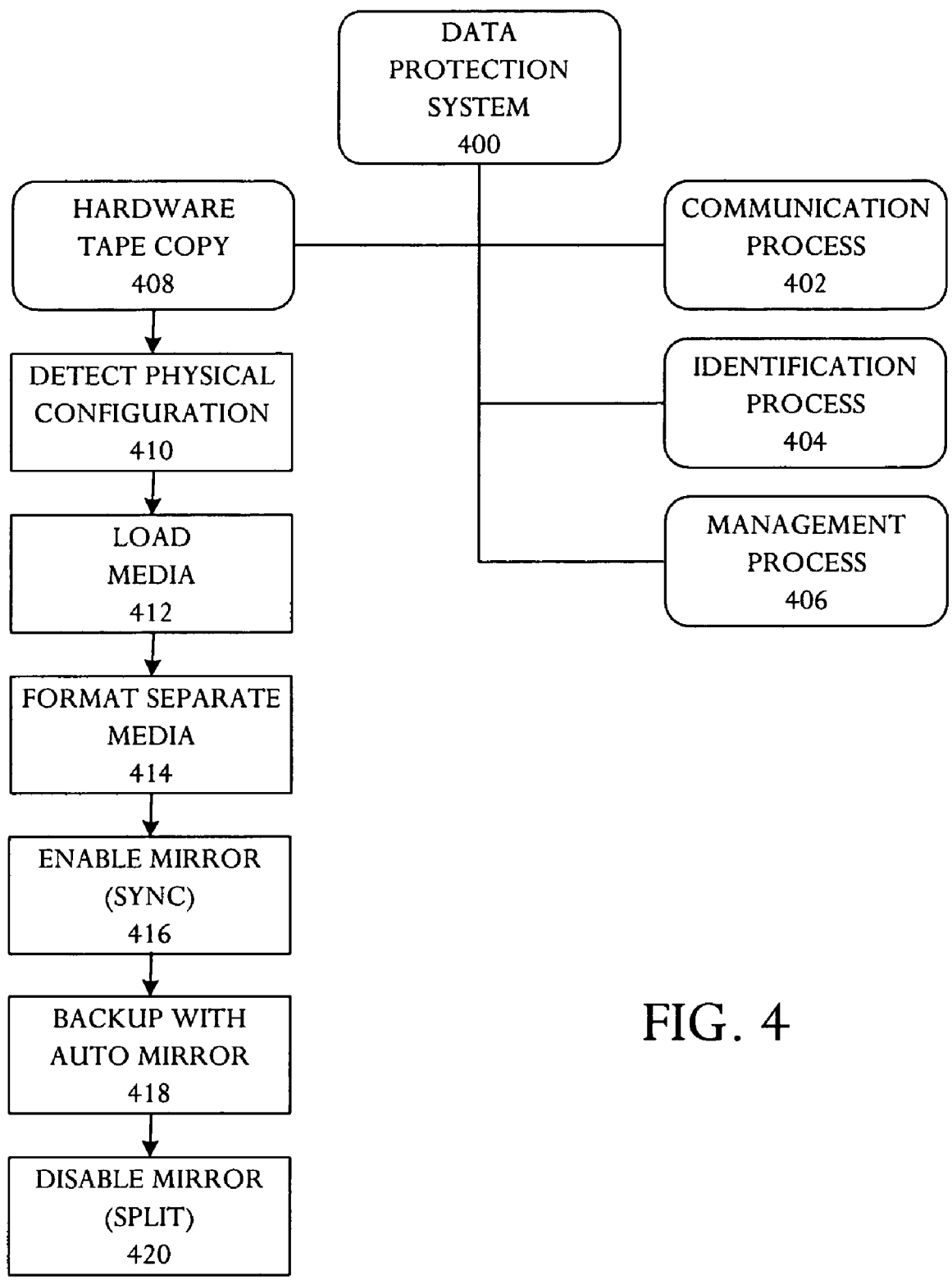
FIG. 4 is a flow chart illustrating an example of the operation of an embodiment of a data protection system for a storage network that includes a plurality of tape storage devices.

Referring to FIG. 4, a flow chart illustrates an example of the operation of an embodiment of a data protection system 400 for a storage network that includes a plurality of tape storage devices. The data protection system 400 executes from a control element or processor and comprises a communication process 402 that communicates with a mirror interface. The mirror interface has a selective capability to mirror write operations directed to a first tape storage device to a second tape storage device. The data protection system 400 has an identification process 404 that identifies the tape storage devices as separate and distinguishable devices. The data protection system 400 also includes a management process capable of communicating with the tape storage devices via the communication process 402 and utilizing the identification process 404 to distinguish the tape storage devices. The management process 406 manages media for the individual tape storage devices separately.

The data protection system 400 in use with a tape library detects separate tape drives and manages media for the individual drives separately. However, in a case that the data protection system 400 detects presence of a bridge control LUN, for example a FC-SCSI bridge control LUN, during library discovery and also detects existence of the tape mirror MODE page, the data protection system 400 can execute the novel hardware tape copy function that utilizes the mirror functionality described with respect to FIGS. 1, 2, and 3. A user can enable the hardware tape copy function 408, causing the data protection system 400 to utilize the mirror mode. The option to enable tape mirroring mode is generally on a per backup job basis, therefore a user can enable mirroring on an important backup job while operating in standard mode, with non-mirrored drives, for other less important backup jobs.

The data protection system 400 detects the physical configuration of the tape library 410 to identify the tape drives attached to the bridge and determine the primary drive and the secondary drive or drives. In some embodiments, information regarding primary and secondary status can be supplied by a mirror MODE PAGE, for example showing the tape drive serial number that is the primary device in the mirror.

The data protection system 400 commands the library robotic device to load media into the designated primary and secondary drives 412. The capability to control the multiple tape drives separately enables complete control over the particular media that is loaded into the individual drives. Typically, the data protection system 400 loads scratch media that can be overwritten for backups into the primary and secondary drives. The data protection system 400 can detect and replace defective media, marking the media as defective.

Once usable media is loaded into the primary and secondary tape drives, the data protection system 400 can command the tape drives to format the individual media 414 for backup operations. Formatting typically entails writing a software label to the beginning of the media that enables tracking of the media in databases. Formatting can also involve writing other tape header information and file marks. The formatted media elements are separately trackable backup media elements that are capable of accepting backup data.

The data protection system 400 uses the control LUN of the bridge to enable the tape mirror mode by issuing a SYNC command 416 via the SCSI MODE page. With mirroring enabled, the data protection system 400 executes a normal backup operation directed to the primary drive 418. As backup data is written to the primary drive, the mirroring functionality causes the same data to be mirrored and written to the secondary drive or drives, generating one or more concurrent copies of the backup. On completion of the backup write phase, the data protection system 400 disables the mirror mode 420 using the SCSI MODE page, and performs any non-write activities, for example writing of file marks and other information, to close the backup sessions on the primary and secondary tape drives. After the backup operation is completed, the data protection system 400 can perform a variety of operations including again enabling mirror mode to begin another backup session, disable mirror mode, or other operations while the same media in loaded in the tape drives.

If an error code is returned during the backup operation that indicates the WRITE to one of the tape drives is a failure, then the data protection system 400 can respond with various actions. Tape mirroring enables continued operation of the backup operation despite failure of one of the tape drives or failure of the media on one drive. The backup operation can continue uninterrupted on the remaining drive and media. In some embodiments or in some conditions, the data protection system 400 can disable mirror mode, unload the defective tape from the failed drive, load the good tape into the primary drive, if the WRITE to the secondary drive failed, and continue the remainder of the backup as normal. The data protection system 400 generates an error signal indicating failure of the mirroring functionality and success of only a single backup. Alternatively, the data protection system 400 can replace the bad media with good media, disable the mirror mode, rewind the media, and restart the backup session from the beginning.

During running of the tape backup session to the primary tape drive with the hardware tape copy option enabled, the data protection system 400 protects any backup operations directed to a secondary tape drive. In some embodiments or in some conditions, the data protection system 400 can mark the secondary drive or drives as OFFLINE while the mirror backup is active. After completion of the backup operation with hardware tape copy enabled, the resulting backup tapes from the primary and secondary drives can be used separately for any other normal backup operations since the tapes are identified separately and individually, a feature that is unavailable using other backup techniques.

In some embodiments, an option for the hardware tape copy mode may be to unload one copy of the backup media back into the library and unload a second or additional copy into a library mailslot for exporting.

In some embodiments, an option for the hardware tape copy mode may be to enable a user to create different media pools for the primary and secondary backup copies and have different media rotation policies for the separate pools. For example, a pool used for offsite copies can have long retention times with a pool used for onsite storage having shorter retention.

The data protection system 400 enables dynamic configuration of the number of drives in the tape mirror. In contrast, hardware mirror systems are limited to a fixed configuration. For example, the data protection system 400 can operate in a system with four tape drives behind a bridge. The data protection system 400 manages mirroring in various configurations, in some conditions mirroring across all drives, in other conditions configuring a two-drive mirror for one backup job and a four-drive mirror for another backup job.

Figure 5:
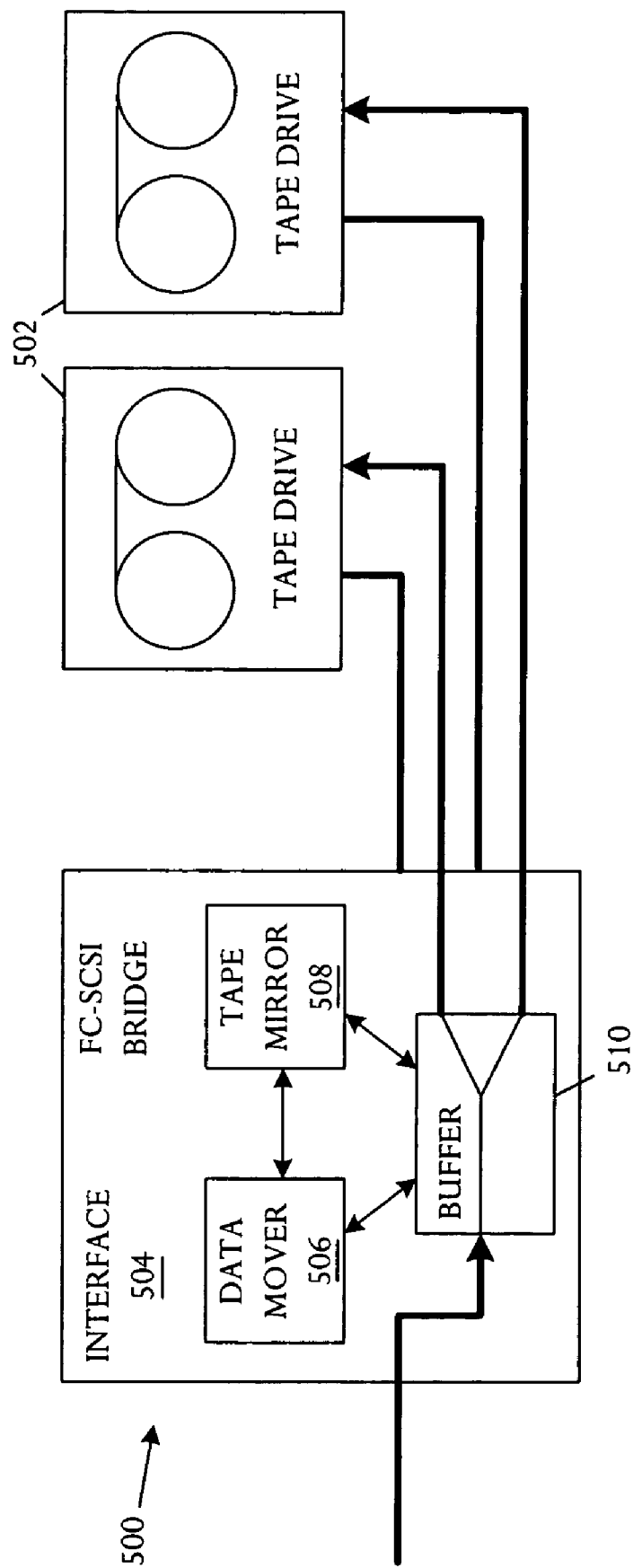
FIG. 5 is a schematic block diagram showing an embodiment of a data protection system capable of storing data on a plurality of tape drives.

Referring to FIG. 5, a schematic block diagram shows an embodiment of a data protection system 500 capable of storing data on a plurality of tape drives 502. The data protection system 500 comprises an interface 504, a data mover 506, and a tape mirror 508. The interface 504 is capable of transferring data from at least one data source to the plurality of tape drives 502. The data mover 506 is coupled within or associated with the interface 504 and moves data from source to destination, bypassing intermediate system elements. Typically, the data mover 506 is an element that copies blocks of data directly from disk to tape at very high speed bypassing resources such as Local Area Network (LAN), Central Processing Unit (CPU), and input/output (I/O) resources.

The tape mirror 508 is coupled within or associated with the interface 504 and the data mover 506. The tape mirror 508 presents the plurality of tape drives 502 as separate media devices. The tape mirror 508 receives data from the data mover 506 and selectively transfers the data in a synchronous mode so that writes to a target tape media are mirrored to a mirrored tape media. In a split mode, the tape mirror 508 writes data to individual drives of the plurality of tape drives 502 independently.

In some embodiments, the data protection system 500 also includes a buffer 510 that receives data from the data mover 506 and the tape mirror 508 and splits the data into multiple write streams for transfer to a plurality of tape drives 502.

The data protection system 500 integrates data mover functionality into a bridge, such as a FC-SCSI bridge, in combination with tape mirror functionality. In a typical external data mover application, for example using an XCOPY SCSI command standard, the data mover reads data from a source and sends the data to the tape mirror. The tape mirror splits the data into multiple write streams. Performance latency may occur in the data mover as the data read from the source, for example disks, are transferred to the tape mirror. The tape mirror used with a data mover is generally a hardware-implemented mirror.

In contrast, the illustrative data mover 506 is integrated into the bridge or interface 504 with the tape mirror 508 and begins functioning as the interface 504 reads data from the source disks into the buffer memory 510 using the XCOPY data mover functionality. The data mover 506 detects whether the tape mirror 508 is enabled and, if so, generates two duplicate writes, one to each tape drive 502 attached to the interface 504 from data in the buffer memory 510. The internal data mover 506 introduces no latency between the data mover 506 and the tape mirror 508, improving performance and the transfer rate of data passing through the bridge.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the figures and discussion depict particular types of storage systems. The systems and methods described herein can be utilized in any appropriate storage system. Similar, the illustrative examples disclose interfaces, buses, and components that comply with particular standards, such as Fibre Channel and Small Computer Systems Interface standards. In other implementations, the disclosed systems and methods can be configured to conform to other standards or to custom implementations compliant with no standard at all.

What is claimed is:

1. A tape mirror interface configured for usage in a tape storage system comprising:
    an input terminal coupled to at least one input node and configured for receiving data transfer requests from at least one host external to the tape storage system;
    a plurality of output terminals coupled to a plurality of tape storage devices in the tape storage system; and
    a control element coupled to the input terminal and plurality of output terminals, the control element presenting for host logical access at least two associated mirror devices of the plurality of tape storage devices as separate media devices and selectively controlling data transfer in the at least two associated mirror devices in a synchronous mode so that writes to a logical target tape storage media directed to the tape mirror interface are mirrored to a mirrored tape storage media and in a split mode so that writes to logical target tape storage media directed to selected tape storage devices are written to the tape storage devices independently without mirroring.

2. The tape mirror interface according to claim 1 wherein:
    the control element responds to a SYNC command directed to the tape mirror interface accesses the at least two associated minor devices by synchronously writing data to a primary tape storage device and to a secondary tape storage device with data discrepancies between the primary tape storage device and the secondary tape storage device preserved.

3. The tape mirror interface according to claim 1 wherein:
    the control element responds to a SPLIT command directed to the at least two associated mirror devices by enabling writing to a primary tape storage device and to a secondary tape storage device separately without mirroring.

4. The tape mirror interface according to claim 1 wherein: the control element is implemented in a software Application Programming Interface (API) executable on an external host computer.

5. The tape mirror interface according to claim 1 wherein: the control element is implemented in a hardware Small Computer Systems Interface (SCSI) Logical Unit (LUN) enabling mirror configuration commands to be transferred as SCSI commands.

6. The tape mirror interface according to claim 1 wherein: the control element is implemented in a hardware out-of-band management interface.

7. The tape mirror interface according to claim 1 wherein: the control element is implemented in a hardware Local Area Network (LAN) based control interface using a Transmission Control Protocol/Internet Protocol (TCP/IP) management protocol.

8. The tape mirror interface according to claim 1 further comprising:
the control element configured to present the selected individual tape storage devices as separate logical units (LUNs) for accessing in the split mode, and configured to present the tape mirror interface as a single logical unit (LUN) for minor access to a plurality of tape storage devices in the synchronous mode.

9. A command interface controller for usage in a tape storage array comprising:
a command interpreter capable of identifying at least one interface command; and
a control element responsive to the identified at least one interface command and selectively controlling data transfer in a synchronous mode so that writes to a target tape storage media are received by a mirror interface as a logical target and mirrored to a mirrored tape storage media in the tape storage array and in a split mode so that writes are written to the target tape storage media as logical targets independently without mirroring.

10. The command interface according to claim 9 wherein: the control element presents for logical access a plurality of tape storage devices and corresponding media in the tape storage array to a host device external to the tape storage array that issues commands to separate and individual tape storage devices and media.

11. The command interface according to claim 9 wherein: the command interpreter identifies a MODE command; and
the control element responds to the MODE command by designating whether the command interface controller supports tape mirror functionality and whether tape mirror functionality is enabled or disabled.

12. The command interface according to claim 9 wherein: the command interpreter identifies a SYNC command; and
the control element responds to the SYNC command by enabling mirror functionality and synchronously writing data to a primary tape storage device and to a secondary tape storage device with data discrepancies between the primary tape storage device and the secondary tape storage device being preserved.

13. The command interface according to claim 9 wherein: the command interpreter identifies a SYNC command; and
the control element responds to the SYNC command by determining whether less than two tape storage devices are coupled to the command interface and, if so, returning an error message.

14. The command interface according to claim 9 wherein: the command interpreter identifies a SPLIT command; and
the control element responds to the SPLIT command by disabling mirror functionality and writing to a primary tape storage device and to a secondary tape storage device separately without mirroring.

15. The command interface according to claim 9 wherein; the control element configured to present selected individual tape storage devices as separate logical units (LUNs) for accessing in the split mode, and configured to present the tape mirror interface as a single logical unit (LUN) for mirror access to a plurality of tape storage devices in the synchronous mode.

16. An article of manufacture comprising:
a controller usable medium having a computable readable program code embodied therein for executing in a command interface controller for usage in a tape storage array, the computable readable program code further comprising:
a computable readable program code capable of causing the controller to identify at least one interface command; and
a computable readable program code capable of causing the controller to respond to the identified at least one interface command and selectively control data transfer in a synchronous mode so that writes to a target tape storage media are received by a mirror interface as a logical target and mirrored to a mirrored tape storage media in the tape storage array and in a split mode so that writes are written to the target tape storage media as logical targets independently without mirroring.

17. The article of manufacture according to claim 16 wherein the computable readable program code further comprises:
a comparable readable program code capable of causing the controller to identify a MODE command; and
a computable readable program code capable of causing the controller to respond to the MODE command by designating whether the command interface supports tape mirror functionality and whether tape mirror functionality is enabled or disabled.

18. The article of manufacture according to claim 16 wherein the computable readable program code further comprises:
a computable readable program code capable of causing the controller to identify a SYNC command; and
a computable readable program code capable of causing the controller to respond to the SYNC command by enabling mirror functionality and synchronously writing data to a primary tape storage device and to a secondary tape storage device with data discrepancies between the primary tape storage device and the secondary tape storage device being preserved.

19. The article of manufacture according to claim 16 wherein the computable readable program code further comprises:
a computable readable program code capable of causing the controller to identify a SYNC command; and
a computable readable program code capable of causing the controller to respond to the SYNC command by determining whether less than two tape storage devices are coupled to the command interface and, if so, returning an error message.

20. The article of manufacture according to claim 16 wherein the computable readable program code further comprises:

a computable readable program code capable of causing the controller to identify a SPLIT command; and a computable readable program code capable of causing the controller to respond to the SPLIT command by disabling mirror functionality and writing to a primary tape storage device and to a secondary tape storage device separately without mirroring.

21. A data protection system capable of staring data on a plurality of tape drives in a tape storage system comprising:

an interface in the tape storage system configured for transferring data from at least one data source external to the tape storage system to the plurality of tape drives in the tape storage system;

a data mover coupled to the interface configured for moving data from source to destination, bypassing intermediate system elements; and a tape mirror coupled to the interface and coupled to the data mover, the tape mirror presenting for logical access by a host external to the tape storage system at least two associated mirror tape drives of the plurality of tape drives as separate media devices, receiving data from the data mover, and selectively transferring the data in a synchronous mode so that writes to a logical target tape media of the at least two associated mirror tape drives are directed to the interface and mirrored to a mirrored tape media of the at least two associated mirror tape drives and in a split mode so that writes to logical target tape storage media directed to selected tape drives are written to the at least two associated tape drives independently without mirroring.

22. The data protection system according to claim 21 further comprising:

a buffer coupled to the data mover and coupled to the tape mirror, the buffer capable of receiving data from the data mover and the mirror and splitting the data into multiple write streams for transfer to a plurality of tape drives.

23. The data protection system according to claim 21 wherein:

the interface is a Fibre-Channel to SCSI bridge; and the data mover is an XCOPY SCSI command.

24. The data protection system according to claim 21 wherein:

the interface is a bridge selected from among a group of bridges comprising:

a bridge between external Fibre Channel (FC) hosts and internal Small Computer Systems Interface (SCSI) devices;

a bridge between external FC devices and internal FC devices;

a bridge between external internet SCSI (iSCSI) devices and internal SCSI devices;

a bridge between external internet SCSI (iSCSI) devices and internal FC devices; and a bridge between external iSCSI devices and internal iSCSI devices.

25. The data protection system according to claim 21 further comprising:

a buffer coupled to the interface, the data mover, and the tape mirror; and a control process capable of executing, in at least one control element buffer, a plurality of actions comprising:

controlling the interface to read data from a data source into the buffer using data mover functionality;

controlling the data mover to detect whether the tape mirror is enabled;

controlling the tape mirror, if enabled, to generate duplicate writes to at least two tape drives attached to the interface from the buffer.

26. A data protection system for usage in a tape storage array comprising:

means for identifying at least one interface command; and means responsive to the identified at least one interface command for selectively controlling data transfer in at least two associated mirror tape storage media in a synchronous mode so that writes to a target tape storage media of the at least two associated mirror tap storage media are received by a mirror interface as a logical target and mirrored to a mirrored tape storage media of the at least two associated mirror tap storage media in the tape storage array and in a split mode so that writes are written to the target tape storage media as logical targets independently without mirroring.

* * * * *

UNITED STATES PATENT AND TRADEMARK OFFICE
CERTIFICATE OF CORRECTION

PATENT NO. : 7,237,056 B2
APPLICATION NO. : 10/715167
DATED : June 26, 2007
INVENTOR(S) : Stephen Gold et al.

It is certified that error appears in the above-identified patent and that said Letters Patent is hereby corrected as shown below:

In column 10, line 57, in Claim 2, delete "minor" and insert -- mirror --, therefor.

In column 11, line 24, in Claim 8, delete "minor" and insert -- mirror --, therefor.

In column 12, line 36, in Claim 17, delete "comparable" and insert -- computable --, therefor.

In column 13, line 8, in Claim 21, delete "staring" and insert -- storing --, therefor.

In column 14, line 35, in Claim 26, delete "tap" and insert -- tape --, therefor.

In column 14, line 38, in Claim 26, delete "tap" and insert -- tape --, therefor.

Signed and Sealed this

Twelfth Day of August, 2008

JON W. DUDAS
*Director of the United States Patent and Trademark Office*